United States Patent
Wood

(10) Patent No.: US 6,481,177 B1
(45) Date of Patent: Nov. 19, 2002

(54) INSIDE CORNER CONNECTOR FOR STRUCTURAL FRAMING MEMBERS

(75) Inventor: John Wood, Battle Creek, MI (US)

(73) Assignee: 80/20, Inc., Columbia City, IN (US)

( * ) Notice: Subject to any disclaimer, the term of this patent is extended or adjusted under 35 U.S.C. 154(b) by 0 days.

(21) Appl. No.: 09/698,605

(22) Filed: Oct. 27, 2000

(51) Int. Cl.[7] .............................................. E04C 2/38
(52) U.S. Cl. ..................... 52/656.9; 403/295; 403/230; 403/189; 403/231
(58) Field of Search ............................ 52/655.1, 653.1, 52/653.2, 656.1, 656.9, 657, 658, 665; 403/403, 230, 231, 241, 292, 295, 205, 375, 188, 189, 170; 248/225.11, 223.41

(56) References Cited

U.S. PATENT DOCUMENTS

| | | | | |
|---|---|---|---|---|
| 1,863,995 A | * | 6/1932 | Ponstingl | 403/295 |
| 3,669,479 A | * | 6/1972 | Payne | 403/230 |
| 3,901,612 A | * | 8/1975 | Canin | 52/656.9 X |
| 4,026,084 A | * | 5/1977 | Goose | 52/656.9 X |
| 4,073,113 A | * | 2/1978 | Oudot et al. | 403/189 X |
| 4,168,922 A | * | 9/1979 | Worrallo | 403/231 |
| 5,116,161 A | * | 5/1992 | Faisst | 403/231 |
| 5,479,733 A | * | 1/1996 | Kusina | 52/656.9 X |

OTHER PUBLICATIONS

Bosch Aluminum Structural Framing System, pp. 3–10, 1999–2000 Cat.

* cited by examiner

Primary Examiner—Carl D. Friedman
Assistant Examiner—Steve Varner
(74) Attorney, Agent, or Firm—O'Malley and Firestone

(57) ABSTRACT

A connector is provided for structural framing members having T-slots running lengthwise along a major surface of the structural framing member. The connector includes a pair of guides, each guide being sized to fit within a T-slot of one of the framing members for linear movement. A strut diagonally connects the pair of guides holding the guides mutually perpendicular to one another. The connector further includes each of the pair of guides being elongated in the direction of linear movement within a T-slot. Each guide further has a cross sectional shape in a direction perpendicular to the direction of elongation conforming to the interior shape of the T-slot. Each guide is also open at both ends in the direction of elongation allowing introduction of the guide to an open end of a T-slot of a structural framing member.

11 Claims, 3 Drawing Sheets

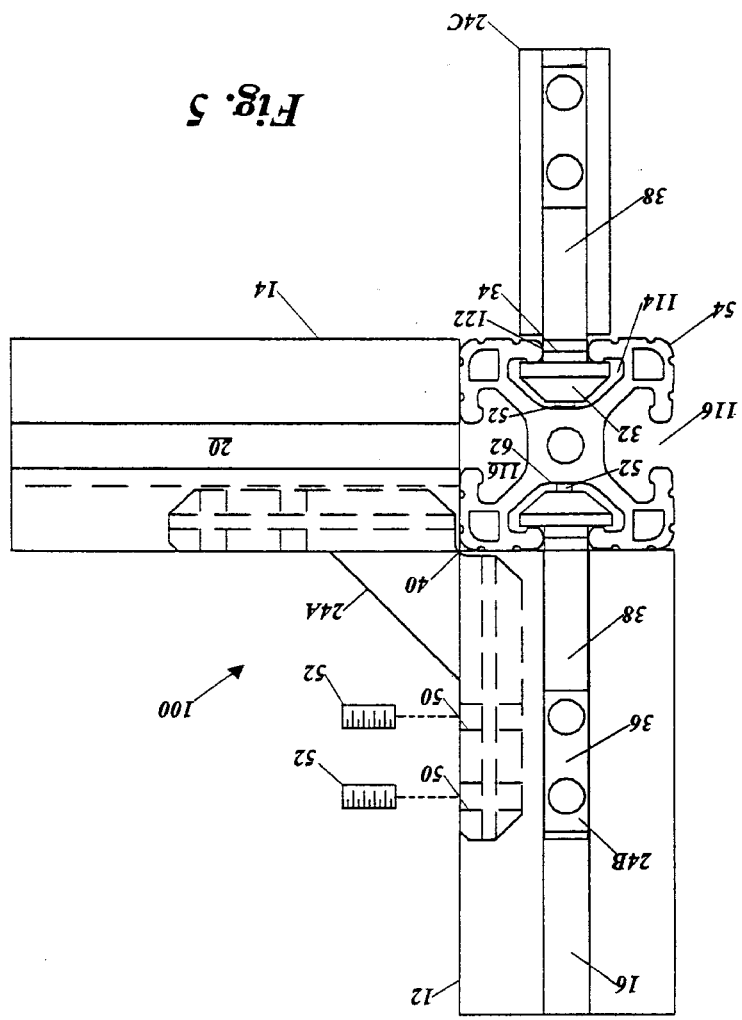

INSIDE CORNER CONNECTOR FOR STRUCTURAL FRAMING MEMBERS

BACKGROUND OF THE INVENTION

1. Field of the Invention

The present invention relates to modular framing systems and more particularly to assembly accessories used to attach one structural framing member to another.

2. Description of the Prior Art

Structures built from modular framing systems based on aluminum alloy structural framing members (commonly termed "profiles") are lighter and more easily assembled than similar structures framed from steel tubes. Ease of assembly and the absence of a need to weld, with consequential labor savings, is an important market place advantage of aluminum profiles over steel tubes. A feature of aluminum profiles that confers this advantage in assembly is T-slots which run lengthwise along the profiles on the exterior of the members. Aluminum profiles can be fabricated with a T-slot because aluminum has a lower melting temperature than steel and this allows aluminum to be readily extruded. Steel cannot be extruded at convenient temperatures. An extrusion die may be used to apply a wide variety of cross-sectional shapes to the aluminum profile. One such shape is the T-slot.

T-slots allow the quick and easy introduction of a wide variety of attachment accessories which may be oriented to cooperate with the interior surfaces of the T-slot for positioning and locking, often without mechanical modification of the framing member. T-nuts are one example of such an accessory.

Another example of a type of connector is an inside-to-inside gusset available from Bosch Automation Technology, Buchanan, Mich. and described at page 3–10 in the Bosch Aluminum Structural Framing System Catalog for 2000. The Bosch inside-to-inside gusset provides a concealed right angle connection of profiles by joining the inside T-slot of one profile to the inside T-slot of a second profile. An inside-to-inside connection is one which leaves all fastening set screws positioned through the gusset accessible after the connection is completed.

The Bosch gusset provides, in essence, a right angle bracket having pairs of horizontally aligned retaining flanges extending from each side of each leg distal to the junction of the legs. The bracket legs are sized to fit through the exterior slit of the T-slot to the exterior surfaces of the profiles. The flanges, which are spaced sufficiently from the junction of the legs to avoid interference with an adjacent profile, retain the bracket in a T-slot, but allow the gusset to be introduced to the slot from either open end of the slot in the profile. The Bosch gusset provides an aesthetically clean joinder of two profiles and is suitable for applications involving light loads. The gusset is necessarily positioned adjacent the end of one profile, however the second profile may be joined at any point along its length. The second profile may be repositioned after assembly. If repositioned to bring the gusset adjacent one of its ends, the first profile may then be moved. However, the apex of the bracket extends out from the T-slot at an open end of a profile. Thus, while the profiles may be positioned so that both are joined substantially adjacent their ends by the gusset, the gusset apex will prevent positioning a third profile against adjacent open ends of a joined pair of profiles. This feature of T-slot extrusions restricts application of the gusset structurally.

SUMMARY OF THE INVENTION

According to the invention there is provided a connector for positioning a pair of structural framing members perpendicular to one another. The structural framing members each have at least one T-slot running lengthwise along a major surface of the structural framing member. The connector includes a pair of guides, each guide being shaped and sized to fit within a T-slot of one of the framing members for positioning. A strut diagonally connects the pair of guides, holding the guides in fixed positions relative to one another, usually mutually perpendicular. The connector further includes each of the pair of guides being elongated in its direction of linear movement within a T-slot. Each guide further has a cross sectional shape in a direction perpendicular to its direction of elongation conforming to the interior shape of the T-slot. Guides may be introduced at either of two ends in the direction elongation to an open end of a T-slot of a structural framing member.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a side view of a mechanical structure displaying applications of the right angle connector.

DETAILED DESCRIPTION OF THE INVENTION

Figure 1:
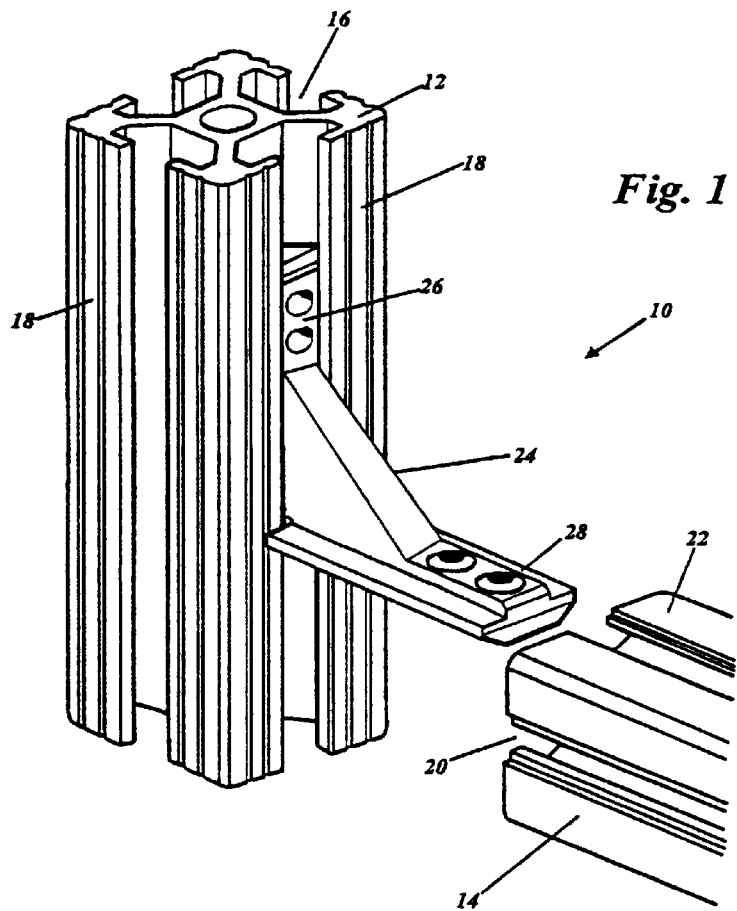
FIG. 1 is a partially exploded view of a mechanical structure incorporating the right angle connector of the invention.

Referring now to FIG. 1, a mechanical assembly 10 is illustrated in a partially exploded view which incorporates a pair of aluminum profiles 12 and 14 and a right angle connector 24. Aluminum profiles 12 and 14 have a characteristic rectangular cross-sectional shape and are elongated. T-slots 16 and 20 are oriented to run parallel to the direction of elongation of profiles 12 and 14, respectively and to intersect one another when profiles are properly oriented. The T-slots 16 and 20 have narrow slit openings centered in the major exterior faces 18 and 22 of aluminum profiles 12 and 14, respectively.

An inside angle connector 24 is illustrated with one guide 26 positioned in a T-slot 16 of aluminum profile 12. A second guide 28 is oriented by insertion of guide 26 into a T-slot 16 to be perpendicular to the major face 18 in which the same T-slot is centered. A free end of guide 28 is distal to the T-slot and may receive aluminum profile 14 by an open end of a T-slot 20. The aluminum profile 14 may be joined to profile 12 by inside angle connector 24 to complete an assembly of the two profiles. The guides 26 and 28 of an inside angle connector 24 are preferably perpendicular, however, they may be fabricated at different angles to one another.

Figure 2:
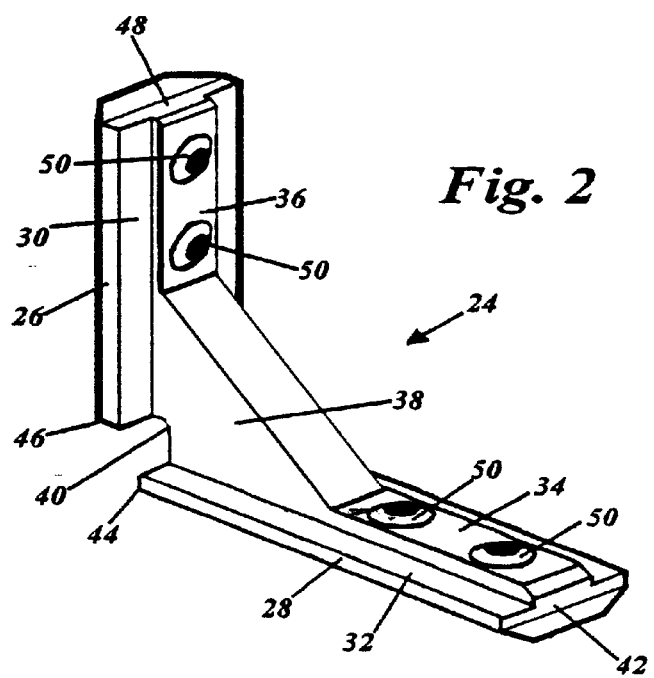
FIG. 2 is a perspective view of the right angle connector of the present invention.
Figure 3:
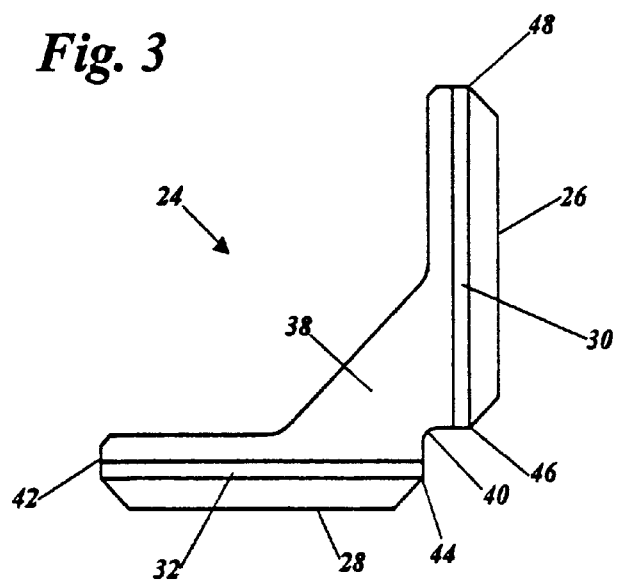
FIG. 3 is a side elevation of the right angle connector of the present invention.
Figure 4:
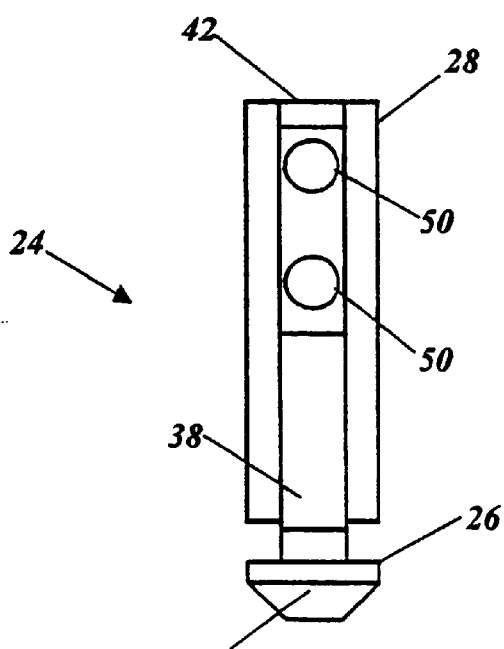
FIG. 4 is top view of the right angle connector.

FIGS. 2–4 illustrate a right angle inside angle connector 24 in detail. Connector 24 is a one piece casting, preferably of stainless steel or brass. Connector 24 has two guides 26 and 28 disposed in a plane, perpendicular to one another.

Guides 26 and 28 comprise guide slide sections 30 and 32, respectively, which in turn conform roughly with the interior shape for a main channel of a T-slot. A T-slot's innterior channel is roughly shaped like a truncated trapezoid. Guide slide sections 30 and 32 are sized smaller than the interior channel of the T-slots. If unrestained, guide slide sections 30 or 32 slide freely in the channels, until positionally fixed by a set screw or other locking mechanism. The top surfaces (i.e. the surface oriented away from the center of a profile when a guide is inserted into a T-slot) of guide slide sections 30 and 32 are broken by central ribs 34 and 36 which extend upwardly and which complete the fit of guides 26 and 28 within a slit opening between the major channel of a T-slot and an external major face of an aluminum profile. Alternatively, guide slide sections 30 and 32 may be viewed as, or replaced by, retaining flanges extending perpendicularly outwardly from the plane of ribs 34 and 36. Whether a guide or flange is used, retention of legs 26 and 28 in T-slots against direct removal from the T-slot is provided by guide slide sections 30 and 32. Guides 26 or 28 must be inserted to or removed from a T-slot at an open end of an aluminum profile.

The right angle orientation of guides 26 and 28 in a plane leaves open ends 46 and 44 of the guides relatively proximate an apex of the connector 24 and a pair of distal open ends 48 and 42. No true apex is actually formed, because a notch 40 is formed into the corner formed by guides 26 and 28 in connector 24. Notch 40 is shaped to conform a section of an exterior shape of an aluminum profile, which allows a connector 24 to be used to attach a pair of perpendicular aluminum profiles to a third perpendicularly positioned profile. Notch 40 also leaves ends 44 and 46 open to allow introduction of guides 26 and 28 into the T-slots. It should be apparent that guides 26 and 28 may be introduced to an open end of a T-slot by either end of the guides.

Guides 26 and 28 are interconnected by a central strut 38 formed from a solid web between ribs 34 and 36. Central strut 38 is positioned substantially proximate to notch 40 between guides 26 and 28 with its base on both guides extending approximately half way out the length of ribs 36 and 34 toward the distal ends 48 and 42, respectively. Except for notch 40, strut 38 is generally triangular in shape.

A plurality of tap holes 50 are positioned through ribs 34 and 36 and their integral guides 26 and 28. Tap holes 50 allow for the insertion of screws for locking the position of connector 24 in a T-slot.

FIG. 5 illustrates a mechanical structure 100 comprising three aluminum profiles 12, 14 and 54. Aluminum profiles 12, 14 and 54 are arranged at right angles to one another, with aluminum profile 54 providing a base against which end of each of profiles 12 and 14 abuts. A plurality of right angle connectors 24 are attached to profiles by insertion of guides thereof into a T-slot of one or more of aluminum profiles 12, 14 and 54. Right angle connector 24A (shown in partial phantom) links profiles 12 and 14. Set screws 52 may be inserted into tap holes 50 through the legs of connector 24A against an interior surface 62 of a T-slot for locking the connector's position. Profiles 12 and 14 are positioned on connector 24A adjacent ends of the profiles, allowing the assembly of the pair of profiles and the connector to be positioned adjacent a pair of adjacent major surfaces of profile 54. Notch 40 cut into the apex of connector 24A is shaped to conform with the exterior comers of profile 54 allowing the shaft of profile 54 to be positioned snugly against the ends of profiles 12 and 14 and into the notch. Profile 54 may then be linked to one or both of profiles 12 and 14 by the use of additional right angle connectors. As illustrated, a connector 24B has had legs thereof inserted into T-slots 16 and 116 of profiles 12 and 54, respectively. Additional profiles may be positioned around the exterior of profile 54, either as linked pairs, or individually.

As discussed above, a guide 28 of a right angle connector 24C includes a guide slide section 32 having a cross-sectional shape substantially akin to a truncated trapezoid. The cross-sectional shape of guide slide section 32 conforms with the interior shape of the main channel 114 of a T-slot 116. Positioning a set screw 52 through the guide 28 against the bottom (deepest) interior surface of the main channel 54 presses the guide outwardly forcing the upper surfaces of guide slide section 32 against the interior or underside of slit lips 122, which partially close the main channel 114. Guide slide section 32 cannot be upwardly withdrawn from a T-slot, but rather must be slid out from one or the other ends of profile 54. The slit in T-slot 116 formed by lips 122 fits snugly around central rib 34 extending outwardly from the upper surface of guide slide section 32, assuring that connector 24C is kept upright in the T-slot. Another profile may be readily placed on connector 24C.

The right angle connector for aluminum profiles of the present invention provides a bracket device having a pair or right angle guides shaped for retention in a profile T-slot. By attaching the guides to one another using a strut like member, and by notching the apex of the connector, the connector provides an aesthetically clean joinder of two profiles. Where both profiles are attached to the connector adjacent an end of each profile, the notch allows a third profile to brought snugly into an opening defined by the ends of the profile and the notch in the connector. The strut also provides greater load bearing capacity than prior art inside-to-inside gussets while, like the gusset, avoiding any machining of the profiles.

While the invention is shown in only one of its forms, it is not thus limited but is susceptible to various changes and modifications without departing from the spirit and scope of the invention.

What is claimed is:

1. An assembly comprising a pair of structural framing members and a connector for positioning the pair of structural framing members with respect to one another, the assembly comprising:

the structural framing members each having at least one T-slot running lengthwise along a major surface of the structural framing member;

a pair of guides, each of the pair of guides being elongated in a direction of linear movement within a T-slot, and each guide having a cross sectional shape in a direction perpendicular to the direction of elongation conforming to the interior shape of the T-slot of one of the framing members for linear movement; and a strut diagonally connected between the pair of guides for holding the guides in a plane and at right angles to one another.

2. An assembly as claimed in claim 1, further comprising:

each guide having ends in the direction of elongation allowing introduction of the guide to an open end of the T-slot of a structural framing member.

3. An assembly as claimed in claim 2, wherein each guide further comprises:

an upper surface oriented on introduction to a T-slot to face away from the centerline of the structural framing member.

4. An assembly as claimed in claim 3, wherein each guide includes a rib extending upwardly from the upper surface.

5. An assembly as claimed in claim 4, wherein the strut extends from each rib of the connector.

6. An assembly as claimed in claim 5, wherein the strut has an indented perimeter running between adjacent open ends of the guides.

7. An assembly as claimed in claim 6, further comprising locking screws fittable through the guides until contact with an interior surface of a T-slot for preventing movement of the guides in the T-slot.

8. An assembly as claimed in claim 1, further comprising:
the guides being supported on the strut in a mutually perpendicular orientation with respect to the directions of elongation;
the guides having proximate ends by which the guides may be introduced to a T-slot at an end of a structural framing member; and
the strut having an indented perimeter section between the proximate ends allowing a third structural framing member to be positioned substantially snugly against the perimeter section when oriented perpendicularly to both of the pair of structural framing members.

9. A connector for channeled linear members, comprising:
mutually perpendicular first and second elongated sections having a cross sectional shape in a direction perpendicular to the direction of elongation conforming to the interior cross sectional shape of a channel of the channeled linear member, the elongated sections having a pair of ends in the direction of elongation allowing introduction of the elongated sections to open ends of channels in channeled linear members;
a diagonal brace disposed between the first and second elongated sections to lie substantially outside any channel into which either the first or second elongated sections may be introduced;
a first one of each pair of ends being proximate to one another;
an indented perimeter section to the diagonal brace between the proximate first ends allowing a linear member to be placed against the indented perimeter section perpendicular to the directions of elongation for both the first and second elongated sections;
tap holes through the first and second elongated sections; and
set screws positionable in the tap holes.

10. A frame comprising:
at least a first pair of structural framing members, the structural framing members each having at least one T-slot running lengthwise along a major surface of the structural framing member;
a connector for positioning the pair of structural framing members perpendicular to one another, each connector including a pair of guide sections, the guide sections being elongated and each having a cross sectional shapes perpendicular to the direction of elongation conforming to the interior shape of the T-slot; and
a strut diagonally connected between the pair of guide sections holding the guide sections mutually perpendicular and coplaner.

11. A frame as claimed in claim 10, where in the connector further comprises:
each of the pair of guide sections having a direction of linear movement within a T-slot corresponding to the direction of elongation;
the guide sections being supported on the strut in a mutually perpendicular orientation with respect to the direction of elongation of the other guide section;
the guide sections having proximate ends by which the guide sections may be introduced to a T-slot at an end of a structural framing member; and
the strut having an indented perimeter section between the proximate ends allowing a third structural framing member to be positioned substantially snugly against the perimeter section when oriented perpendicularly to both of the pair of structural framing members.

* * * * *